March 4, 1969 W. V. FABRIS 3,430,833
MAGNETIC TAPE DEVICE FOR HIGH TAPE SPEEDS
Filed Sept. 28, 1966
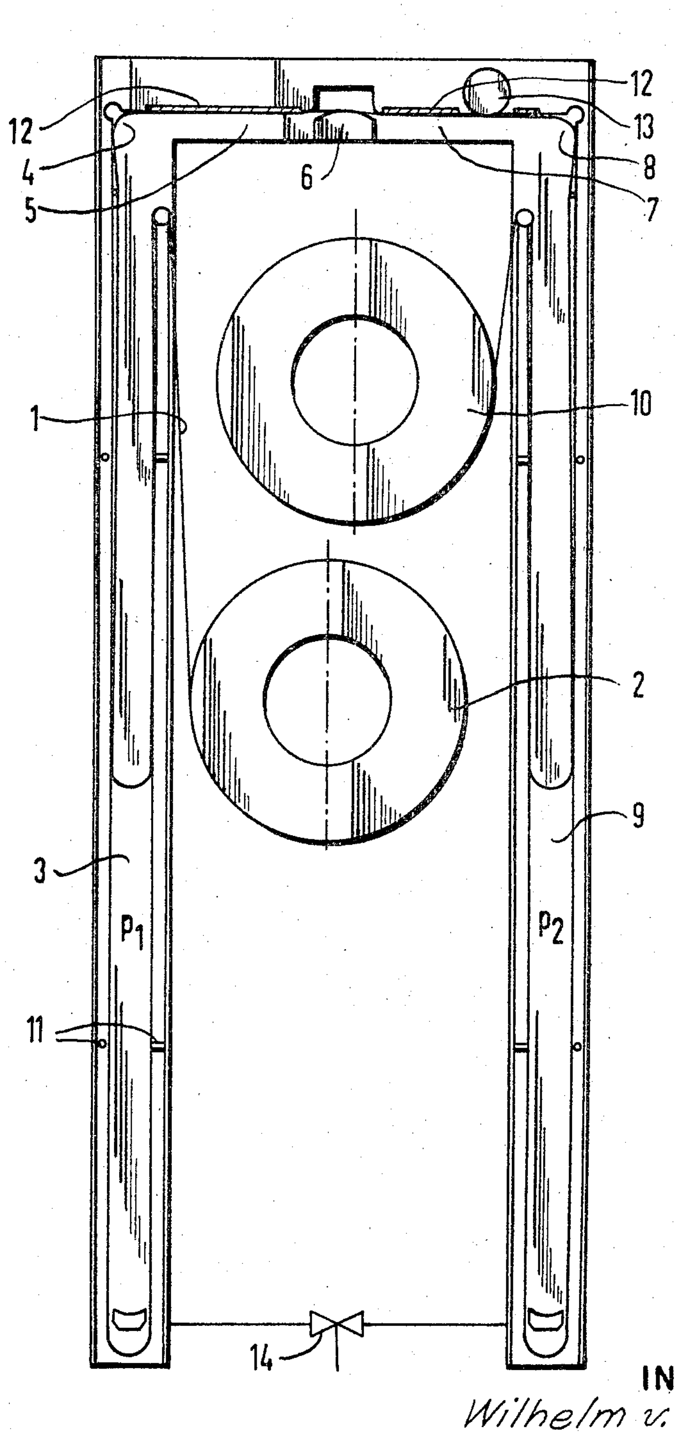
INVENTOR
Wilhelm v. Fabris
BY [signature]
ATTYS.

United States Patent Office 3,430,833
Patented Mar. 4, 1969

3,430,833

MAGNETIC TAPE DEVICE FOR HIGH TAPE SPEEDS

Wilhelm V. Fabris, Munich, Germany, assignor to Siemens Aktiengesellschaft, Munich, Germany, a corporation of Germany Filed Sept. 28, 1966, Ser. No. 582,656
Claims priority, application Germany, Sept. 28, 1965, S 99,725
U.S. Cl. 226—195 4 Claims
Int. Cl. B65h 23/08

ABSTRACT OF THE DISCLOSURE

A magnetic tape unit with pneumatic buffer chambers in which the tape is moved merely by differential pressures therein, both in a forward and a reverse direction, in which the forces exerted on the tape are so selected that a speed would be imparted thereto which is higher than the desired tape speed, braking means being provided by means of which the tape movement may be controlled to achieve the desired speed.

The invention relates to a magnetic tape device for high tape speeds and in particular to a magnetic tape device utilizing pneumatic buffer chambers for the decoupling, on the one hand, of the mass of the tape to be accelerated or to be delayed, and, on the other hand, the mass of the tape reel. Several kinds of transport systems have become known for sufficiently quick transport of tape-like record carriers in connection with data processing, in particular in start-stop operation.

In the first case the record carrier may be pressed, by means of a pressure roller, against a steadily rotating transport roller or capstan. For the required directional change two such systems are required. Disadvantageous with respect to this type of tape transport are the frictional rubbing off of the tape or the transport rollers at the places of mutual contact during the starting of the magnetic tape, the very high initial accelerations of the tape and the longitudinal tape oscillations connected therewith, as well as problems of adjustment.

In a second known transportation system, the magnetic tape is moved by means of a pneumatic transport roller. For this purpose an embracing of the transport roller by the record carrier through at least 90° is required. The magnetic tape, during the starting, is retained on the roller surface by a vacuum in the steadily rotating roller and corresponding air withdrawal channels. For the directional change, two such systems likewise are necessary, in which case the system not actively transporting must lift the record carrier off of the roller by positive pressure in the roller to permit travel in the opposite direction. The principal disadvantages are the relatively complicated control mechanism for the transport roller and the large dispersion of the starting paths occasioned by the sealing problem at the junctions between the rotating and stationary members of the transport roller structure.

In a third known construction, the tape is driven in a forward direction, as well as in a reverse direction by a single transport roll or capstan. If possible, the record carrier must embrace the transport roller by 180°. The directional change is accomplished through reversal of the rotational direction of the transport roller. However, this transport system can be utilized only for low tape speeds since for higher tape speeds the starting paths of the magnetic tape become too large because of the relatively large mass inertia moment of the driving roller and of the driving motor.

It is the purpose of the invention to avoid layer side contact areas of the magnetic tape, such as for example by pressure rollers, speedometer rollers, pivot and guide bolts, to enable the tape mass to be accelerated independently of any supporting or transporting masses of the driving system, and to obtain a steady acceleration of the magnetic tape. According to the invention this is achieved by the feature that the magnetic tape is moved in a forward direction as well as also in reverse direction merely through variations in size of the forces acting upon the tape in the buffer chambers. This can be achieved in an especially simple manner through differential adjustment of the pressures in the buffer chambers. Advantageously, the exact adjustment of the desired tape speed can be obtained by the feature that the size of the forces acting upon the tape in the buffer chambers is so selected that the resulting tape speed would be somewhat too high, whereby the final tape speed can be adjusted through selective braking of the tape by means of a controllable braking device. It is especially advantageous to also maintain the differential between the forces in the buffer chambers during the stopping or rest time for a start-stop operation in one direction and to control the starting and stopping of the tape only by means of a braking device.

A big advantage of the magnetic tape device of the present invention is the fact that any contact whatsoever of the layer side of the record carrier with a transport element or guide element is avoided. A further advantage of the magnetic tape device of the invention is the fact that during the starting process only the single mass of the magnetic tape, independently of the rotating masses of the otherwise customary transport rollers or pressure rollers must be accelerated. Beside this, a monitoring of the transport control which prevents a simultaneous moving in forward direction and reverse direction, and therewith a tearing of the tape, is superfluous in a magnetic tape device according to the invention.

A magnetic tape device according to the invention is explained more fully in connection with the drawing. The record carrier 1, i.e., the magnetic tape, runs from a storage spool 2 into the left buffer chamber 3, through a preliminary buffer 4, along a guide bar 5, over the magnetic head 6, along a further guide bar 7 through a preliminary buffer 8 into the right buffer chamber 9 and to the receiving reel 10.

The quantity of tape in the buffer chamber is, in a manner known per se, scanned by light responsive devices 11 or similar means and brought up to a desired amount by a suitable regulation circuit. The guide bars 5 and 7 may simultaneously be provided with brake members 12 which brake or hold the record carrier fast for example in a pneumatic or electrostatic manner. An example of a pneumatic brake system is illustrated in Pat. No. 3,268,-139. For the transport of the record carrier in a forward direction or in a reverse direction, a pressure differential is created between the buffer chambers 3 and 9, producing a tape driving differential force which transports the record carrier in the desired direction. Advantageously, the pressure differential in the buffer chambers is so adjusted that when the brake is not effective, the tape speed is too large by a suitable percentage. Then for example a speed monitoring roller 13 which, through its brakes 12, can supervise the tape speed, and thus serves for the regulation of a constant transport speed. Any suitable speed sensing switch or the like may be employed in connection with the roller 13 for actuating the brake members, for example, switches of the type illustrated in Patents Nos. 2,920,154, 2,880,288, and 2,929,419, all of which illustrate switches operable in response to the speed of a rotating member, as for example the roller 13. In another advantageous development of the invention the pressure differential between the buffer chambers 3 and 9 is maintained during the stopping or rest time with regard to a start-stop operation in one running direction, whereby the starting operation of the brakes and stopping of the tape may be effected merely by suitable operation of the brakes.

In addition, a control valve 14 is provided which may be switched over to reverse the pressure differential when a directional change in the movement of the record carrier is to be effected.

Having thus described my invention it will be obvious to those skilled in the art, from the disclosure herein given, that various immaterial modifications may be made in the same without departing from the spirit of the invention, hence I do not wish to be understood as limiting myself to the exact form, arrangement and construction illustrated and described, or uses mentioned.

I claim:

1. A magnetic tape device for high tape speeds utilizing buffer chambers for decoupling the mass of the tape to be accelerated or retarded, and the mass of the tape reels therefor, comprising a pair of buffer chambers, said tape having intermediate portions thereof disposed in the respective buffer chambers with such intermediate portions being connected by a further portion, and means for effecting a pressure differential in the buffer chambers acting upon the respective tape portions therein operative to apply respective forces, acting in opposite directions, to said intermediate tape portions within the respective buffer chambers, with the tape being moved in both forward and reverse directions responsive to respective differentials between said forces, said means for applying forces to said tape being so constructed that the forces applied thereto would tend to produce a slightly excessive tape speed, and controllable braking means cooperably related to said tape for applying braking forces to said tape in opposition to the slightly excessive forces applied to said tape by said force-applying means whereby the ultimate tape speed may be adjusted.

2. A magnetic tape device according to claim 1, comprising in further combination, speed monitoring means operatively disposed with respect to said tape for measuring the speed thereof, said speed monitoring means being operatively connected with said controllable braking means for providing a control thereof and thereby of the tape speed.

3. A magnetic tape device for high tape speeds utilizing buffer chambers for decoupling the mass of the tape to be accelerated or retarded, and the mass of the tape reels therefor, comprising a pair of buffer chambers, said tape having intermediate portions thereof disposed in the respective buffer chambers with such intermediate portions being connected by a further portion, means for applying respective forces, acting in opposite directions, to said intermediate tape portions within the respective buffer chambers, with the tape being moved in both forward and reverse directions responsive to respective differentials between said forces, and braking means cooperably related to said tape for applying braking forces thereto, said force-applying means being constructed to maintain said force differential during start-stop operation in one transport direction, whereby such differential will be maintained while the tape is not in motion, with the tape being retained in its stop position by said braking means.

4. A magnetic tape device for high tape speeds utilizing buffer chambers for decoupling the mass of the tape to be accelerated or retarded, and the mass of the tape reels therefor, comprising a pair of buffer chambers, said tape having intermediate portions thereof disposed in the respective buffer chambers with such intermediate portions being connected by a further portion, means for applying respective forces, acting in opposite directions, to said intermediate tape portions within the respective buffer chambers, with the tape being moved in both forward and reverse directions responsive to respective differentials between said forces, said means for applying forces to said tape comprising means for effecting a pressure differential in the buffer chambers, acting upon the tape portions therein, and means associated with said pressure effecting means for selectively reversing the effective direction of said differential to effect a reversal of the tape direction, said force-applying means being constructed to produce a pressure differential sufficient to create a slightly excessive tape speed, and controllable braking means cooperably related to said tape by means of which the ultimate tape speed may be adjusted and by means of which the tape may be brought to a standstill.

References Cited

UNITED STATES PATENTS

| | | | |
|---|---|---|---|
| 3,206,091 | 9/1965 | Kurth | 226—97 |
| 3,268,139 | 8/1966 | Edwards | 226—195 |
| 3,329,364 | 7/1967 | Brettell | 226—97 X |

EDWARD A. SROKA, *Primary Examiner.*